UNITED STATES PATENT OFFICE.

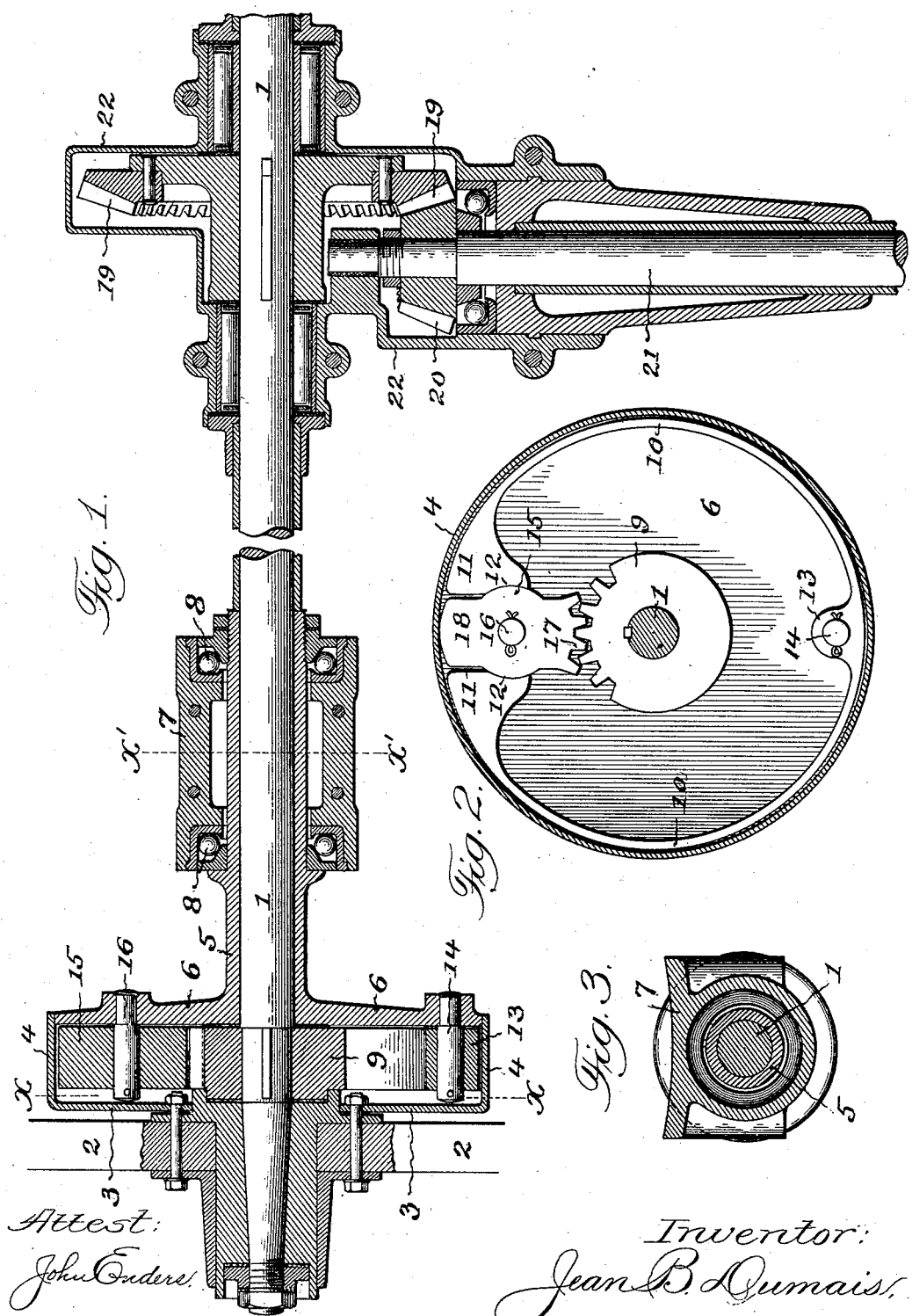

JEAN B. DUMAIS, OF CHICAGO, ILLINOIS, ASSIGNOR OF ONE-HALF TO FRANK R. CRANE, OF CHICAGO, ILLINOIS.

TRACTION-WHEEL DRIVE.

No. 904,413.

Specification of Letters Patent.

Patented Nov. 17, 1908.

Application filed May 8, 1908. Serial No. 431,685.

*To all whom it may concern:*

Be it known that I, JEAN B. DUMAIS, a citizen of the United States of America, and a resident of Chicago, in the county of Cook and State of Illinois, have invented certain new and useful Improvements in Traction - Wheel Drives, of which the following is a specification.

This invention relates to that class of traction drives for motor vehicles in which a single piece axis has driving connection with the traction wheels in a manner which admits of one wheel having a faster rotation than the axle in rounding a curve. And the present improvement has for its object to provide a simple and efficient structural arrangement and combination of parts adapted to transmit positive rotation from the axle to both traction wheels under normal conditions, and at the same time permit of a faster rotation of either wheel as the vehicle rounds a curve in the roadway, all as will hereinafter more fully appear.

In the accompanying drawings: Figure 1, is a central horizontal sectional elevation showing the general arrangement and connection of the present mechanism. Fig. 2, is a detail section on line $x$—$x$, Fig. 1. Fig. 3, is a similar view on line $x'$—$x'$ Fig. 1.

Similar numerals of reference indicate like parts in the different views.

Referring to the drawings, 1 represents the driving axle of the usual single piece formation and upon each end of which a traction wheel 2 is loosely journaled in any usual manner.

3 is a cup shaped housing secured to the inside of each traction wheel; such housing is formed with a circular rim portion 4 in concentric relation to the axis of rotation of the driving axle aforesaid, and with an inwardly facing open end closed by a flanged sleeve hereinafter described.

5 is an elongated sleeve individual to a housing 3 aforesaid, and mounted loosely upon an end portion of the driving axle 1. Such sleeve is provided with a circular flange 6 forming a closure for the inner open end of the aforesaid housing 3, and points of pivotal attachment for the friction clutch members hereinafter described.

7 is a journal box carried by a supporting spring of the vehicle, and forming a bearing in which the elongated shank or portion of said sleeve 5 is journaled by ball bearings 8, or other usual means, to constitute the supporting means between the traction wheel and the body of the vehicle.

9 is a gear wheel keyed or otherwise secured to an end portion of the axle and located within the housing 3 and individual thereto.

10 is an annular clutch member, of a diameter approximating the internal diameter of the housing 3 and adapted for frictional engagement for frictional driving engagement with the inner surface of the circular rim portion thereof. To such end said clutch member is split along its periphery and the gap formed by said split is in turn formed with inward enlargements which in turn are formed with outer opposed and approximately parallel surfaces 11 and inner opposed curved surfaces 12, for operative engagement with the intermediate lever hereinafter described.

13 is a pivot boss or hub arranged on the side of the clutch member 10 directly opposite to the aforesaid split or gap in the same and as illustrated in Fig. 2.

14 is a pivot stud or pin engaging the aforesaid pivot hub 13 to form a pivotal connection between the clutch member 10 and the flange 6 of the sleeve member 5 before described.

15 is an intermediate lever pivoted to the flange 6 of the above mentioned sleeve member by a pivot stud or pin 16, and with its pivot portion or hub in concentric relation to the curved surfaces 12 of the clutch member 10, and having bearing against the same. One end of said lever 15 is formed with gear teeth 17 that mesh with and receive motion from the gear wheel 9 of the driving axle, while the other end 18 is of an approximately rectangular form with its opposed faces in close relation to the parallel surfaces 11 of the clutch member 10 aforesaid.

19 is the usual bevel gear secured centrally to the axle 1, and meshing with and receiving motion from a bevel gear 20 on a countershaft 21, which in turn receives motion from the driving motor of the vehicle.

22 is the usual inclosing housing for the gearing mechanism just described.

In the present traction drive mechanism, the traction wheel is normally free to rotate in either direction under externally applied stress and independent of the axle. With a positive rotation of said axle in one or the other direction the gear wheel 9 acting upon the geared inner end of the intermediate lever 15 imparts a rocking movement to the same. And in unison with such movement of the lever its outer end acts against one or the other of the parallel surfaces 11 of the gap of the annular clutch member 10 to effect an expansion of such clutch member and an engagement between the same and the circular housing 3 of the traction wheel, and so that both traction wheel and axle will revolve in unison. In such expansion movement, the curved surface of the hub of the intermediate lever forms an abutment for the correspondingly curved surface 12 of that side of the gap in the clutch member 10 which is not operatively engaged by the outer end of the intermediate lever 15 as above set forth.

Having thus fully described my said invention what I claim as new and desire to secure by Letters Patent, is:—

1. In a traction drive for motor vehicles, a traction wheel provided with a housing having a circular rim portion in concentric relation to the axis of rotation of the wheel, a driving axle upon which the wheel is journaled, a sleeve mounted loosely upon the axle and formed with a circular flange, an annular clutch member carried by said flange and formed with a peripheral gap, and an intermediate lever pivoted to said flange with its outer end engaging said gap and its inner end in operative engagement with the axle, substantially as set forth.

2. In a traction drive for motor vehicles, a traction wheel provided with a housing having a circular rim portion in concentric relation to the axis of rotation of the wheel, a driving axle upon which the wheel is journaled, a sleeve mounted loosely upon the axle and formed with a circular flange, an annular clutch member carried by said flange and formed with a peripheral gap having outer opposed and approximately parallel surfaces and inner opposed curved surfaces, and an intermediate lever carried by the sleeve flange aforesaid with its outer end arranged between the outer and approximately parallel surfaces of the gap in the clutch member, its hub portion between the curved surfaces of such gap and its inner end in operative engagement with the axle, substantially as set forth.

3. In a traction drive for motor vehicles, a traction wheel provided with a housing having a circular rim portion in concentric relation to the axis of rotation of the wheel, a driving axle upon which the wheel is journaled, a sleeve mounted loosely upon the axle and formed with a circular flange, an annular clutch member carried by said flange and formed with a peripheral gap; a gear wheel secured to the axle, and an intermediate lever pivoted to the aforesaid flange with its outer end engaging said gap and its inner end in operative engagement with the axle, substantially as set forth.

4. In a traction drive for motor vehicles, a traction wheel provided with a housing having a circular rim portion in concentric relation to the axis of rotation of the wheel, a driving axle upon which the wheel is journaled, a sleeve mounted loosely upon the axle and formed with a circular flange, an annular clutch member carried by said flange and formed with a peripheral gap having outer opposed and approximately parallel surfaces and inner opposed curved surfaces, a gear wheel secured to the axle, and an intermediate lever carried by the sleeve flange aforesaid with its outer end arranged between the outer and approximately parallel surfaces of the gap in the clutch member, its hub portion between the curved surfaces of such gap and its inner end formed with teeth engaging the gear wheel on the axle, substantially as set forth.

Signed at Chicago, Illinois, this 2nd day of May 1908.

JEAN B. DUMAIS.

Witnesses:
ROBERT BURNS,
HENRY MOE.